United States Patent [19]

Murasato et al.

[11] Patent Number: 4,604,541
[45] Date of Patent: Aug. 5, 1986

[54] SPLIT STATOR ARMATURE WINDING

[75] Inventors: Shigeru Murasato; Yuji Nakanishi; Kenzou Fujiwara; Norio Takeuchi; Tsuyoshi Horita, all of Kobe, Japan

[73] Assignee: Mitsubishi Denki Kabushiki Kaisha, Tokyo, Japan

[21] Appl. No.: 691,537

[22] Filed: Jan. 15, 1985

[30] Foreign Application Priority Data

Jan. 17, 1984 [JP] Japan ................................. 59-6676

[51] Int. Cl.$^4$ .......................... H02K 1/00; H02K 3/00; H02K 19/26; H02K 21/00
[52] U.S. Cl. .................................... 310/180; 310/184; 310/254
[58] Field of Search ............... 310/166, 179, 180, 181, 310/182, 183, 184, 195, 198, 201, 202, 254, 258

[56] References Cited

U.S. PATENT DOCUMENTS 2,650,316  8/1953  Johns et al. ........................ 310/258
3,932,929  1/1976  Hallerback et al. ............. 310/254 X
4,048,527  9/1977  Hallerback et al. ............. 310/258 X
4,217,510  8/1980  Detinko et al. ....................... 310/51

OTHER PUBLICATIONS

Kaga et al., "Synchronous Machine," Tokyo Denki University, Dec. 20, 1967, pp. 374–375.

Primary Examiner—Patrick R. Salce
Assistant Examiner—Marc S. Hoff
Attorney, Agent, or Firm—Leydig, Voit & Mayer, Ltd.

[57] ABSTRACT

A split stator armature winding comprises a circumferentially split stator core having slots formed therein, a plurality of armature coils mounted in a single layer in the slots without bridging the splitting interface of the split stator, and a dummy coil of a closed circuit, the dummy coil being disposed so as to bridge the splitting interface of the split stator and to extend in the vicinity of the back portion of the coil ends of the armature coils close to the splitting interface of the split stator.

4 Claims, 6 Drawing Figures

SPLIT STATOR ARMATURE WINDING

BACKGROUND OF THE INVENTION

This invention relates to split stator armature winding, and more particularly to armature windings arrangement for a split stator of a dynamoelectric machine in which the stator can be relatively easily assembled and disassembled.

In a.c. machines in which the armature windings are mounted on a stator, the stator must be circumferentially divided when the size of the machine exceeds a certain limit for shipping. Also, the stator must be circumferentially divided when there is not enough space for handling the rotor for axially inserting and withdrawing the rotor from the stator at the time of field installation, inspection, and servicing.

A conventional split armature winding is constructed as shown in FIG. 1, in which three-phase, single layer windings having hexagonal coils are disposed in two slots per pole per phase. The armature windings are wound in a single-layer for convenience of connection and separation at the location of the dividing line. In the figure, a stator iron core 1 is divided and is separable along the dividing line X—X. The stator iron core 1 has a plurality of slots (not known) in which armature coils 2a, 2b and 2c are inserted. The armature coils 2a illustrated by solid lines are of phase U, the armature coils 2b illustrated by dash lines are of phase V, and the armature coils 2c shown by dot-and-dash lines are of phase W. Each of the armature coils 2a, 2b, 2c has winding start lead 3a and an end lead 3b. The connections between the coils in the different phase are not illustrated. The coils 2a, 2b or 2c in the same phase are connected by a connection 4.

In a manufacturing shop, the split stator is put together to form a circular bore therein, and the armature coils 2a, 2b, 2c are inserted in the respective slots formed in the stator iron core 1 and the coils 2a, 2b, 2c are electrically connected. Then, a rotor is assembled in the stator, and the assembled machine is tested. After the test, the stator is divided at the dividing line X—X for shipping. In order to divide the stator shown in FIG. 1, the armature coils 2b having coil ends which extend across the dividing line X—X must be removed from the slots of the stator iron core 1. One of the sides of each coil 2a, 2b, 2c is always below one of the sides of the neighboring coil. For example, armature coil 2b has its right-hand side under the left-hand side of armature coil 2c. Therefore, in order to remove armature coil 2b on the division line X—X from the stator, the left-hand side of the adjacent armature coil 2c must be removed from the slot.

When the divided machine is assembled in the field, the armature coil 2b on the dividing line X—X must again be inserted into the stator slots together with the coil side of the adjacent coil 2c which was removed.

Thus, with the conventional armature winding as shown in FIG. 1, the armature coils must be inserted into the stator slots for testing, and the armature coils which extend across the dividing line of the stator core as well as the side of the adjacent coil must then be removed from the stator slots in order to disassemble the stator for shipping, and the armature coils must again be inserted into the stator core slots when assembling the machine in the field. Also, the coil conductors, which are heavily insulated, are firmly inserted within the slots by means of wedges, and the rotor must be pulled out from the stator before the coil inserting and removing operations can be performed. Therefore, the repeated forced insertions and removals of the coils from the slots in the stator iron core may damage the insulating layer of the coil conductor. Moreover, these operations are time-consuming.

In order to eliminate these above discussed disadvantages of the above-explained conventional arrangement, the use of separable armature coils as shown in FIG. 2 has been proposed. In FIG. 2, the general construction is the same as that shown in FIG. 1 except that the armature coils 2b having coil ends which extend across the dividing line X—X have brazed joints 6. During assembly, the joints 6 are brazed and coated with an insulating layer, and when disassembled the joint 6 can be heated by a torch to melt the brazed joint 6. Therefore, this arrangement eliminates the need for the repeated forced insertion and removal of the armature coils 2b and sides of the adjacent coil 2c. However, this arrangement entails a time-consuming and difficult brazing operation, and the coil conductors must be heated to an elevated temperature, so that the dividing operation still takes a long time and the insulation on the coil conductors can be easily damaged by heat during brazing.

SUMMARY OF THE INVENTION

Accordingly, an object of the present invention is to provide a split stator armature winding that can be easily and quickly divided and assembled.

Another object of the present invention is to provide a split stator armature winding that can be easily and quickly divided and assembled without damaging the insulation on the coil conductors.

With the above objects in view, the present invention resides in a split stator armature winding comprising a circumferentially split stator core having slots formed therein, a plurality of armature coils mounted in a single layer in the slots without bridging over the splitting interface of the split stator, and a dummy coil of a closed circuit, the dummy coil being disposed so as to bridge the splitting interface of the split stator and to extend the vicinity of the back portion of coil ends of the armature coils close to the splitting interface of the split stator.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 1:
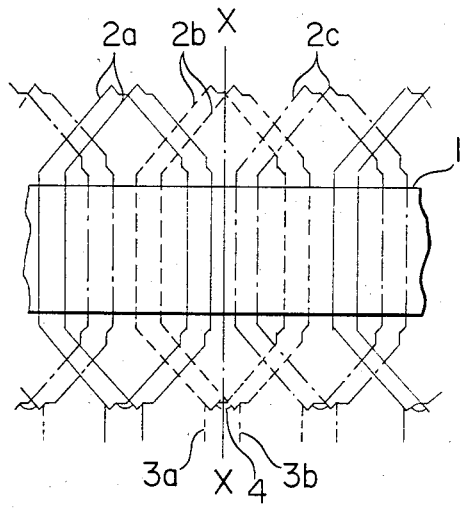
FIG. 1 is a diagram illustrating one example of a conventional split stator armature winding.
Figure 2:
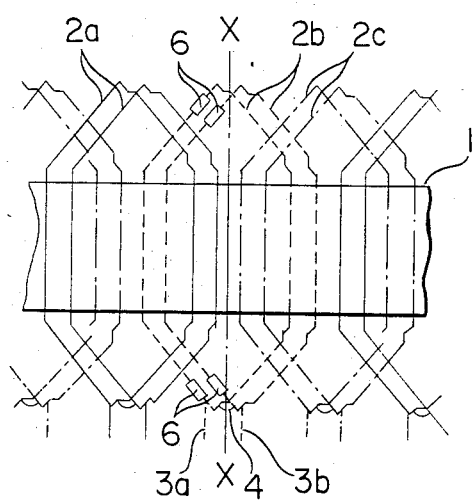
FIG. 2 is a diagram illustrating another example of a conventional split stator armature winding.
Figure 3:
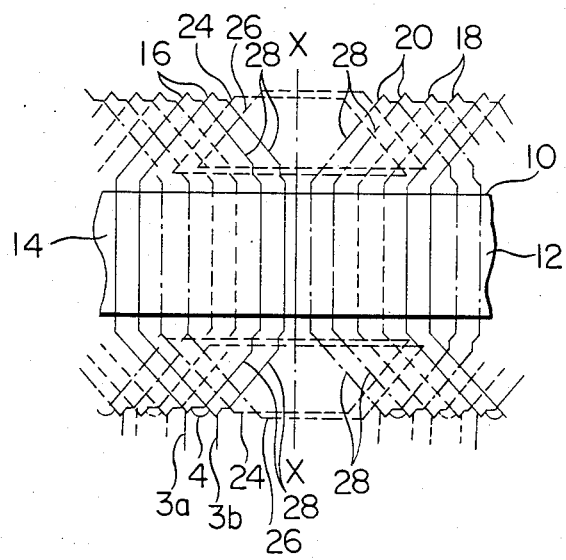
FIG. 3 is a diagram illustrating a split stator armature winding of the present invention.

FIG. 3 of the drawings shows three-phase, single-layer windings having hexagonal coils which are disposed in two slots per pole per phase. The armature windings are wound in a single layer for convenience of connection and separation at the location of the dividing line. In the figure, a iron stator core 10 is divided into two halves 12 and 14 which are separable at the dividing line X—X. Armature coils 16, 18, and 20 illustrated by solid lines, dashed lines, and dot-and-dash lines, respectively, are inserted into the respective slots 22 (FIG. 4) formed in the stator core 10. It is to be noted that there is no armature coil that bridges or extends across the two halves 12 and 14 of the stator core 10. In order to electromagnetically couple the armature coils 16, 18, and 20, two dummy coils 24 and 26 are disposed at both ends of the stator core 10 so as to extend across the dividing line X—X. The dummy coils 24 and 26 are both closed loops which are positioned close to the back side (as viewed from inside the stator core 10) of the coil ends 28 of the armature coils 16-20.

Figure 4:
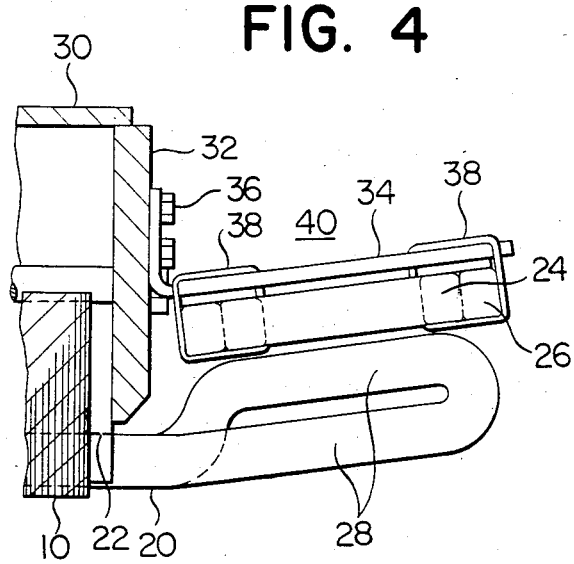
FIG. 4 is a fragmental view showing the dummy coils of the present invention.

FIG. 4 illustrates in a fragmental view a portion of the split stator armature winding including the dummy coils 24 and 26 and the coil end 28. A stator frame 30 which supports the stator core 10 is also circumferentially divided into a plurality of pieces and each piece is put together by a suitable known means so as to be easily disassembled. The stator frame 30 supports a stator clamp 32 which supports a support bracket 34 by bolts 36. The dummy coils 24 and 26 are mounted on the support bracket 34 by suitable straps 38 at a position very close to the coil ends 28 of the armature coils 16-20. Therefore, the inductance between the armature coils in the respective phases are substantially equal to each other and the armature current in each phase are maintained in equilibrium.

When the dummy coils 24 and 26 are to be assembled in the dynamoelectric machine, the dummy coil assembly 40 including two dummy coils 24 and 26, the bracket 34, and the strap 38 is secured to the stator clamp 32 by bolts 36. This assembly operation can be very easily performed in a short time without the need for pulling out the rotor from the stator or removing the armature coil side from the stator slots because there is no mechanical connection between the dummy coil 24 and 26 and the armature coil ends 28.

When it is desired to disassemble the machine for shipping, the dummy coil assembly 40 can simply be detached from the stator clamp 32 by removing the bolts 36. Since there is no mechanical connection and no intermingling of the dummy coils 24, 26 and the coil ends 28, the removal of the dummy coil assembly 40 from the stator can be very easily achieved without the need for pulling out the rotor from the stator or removing the armature coils from the stator slots.

Figure 5:
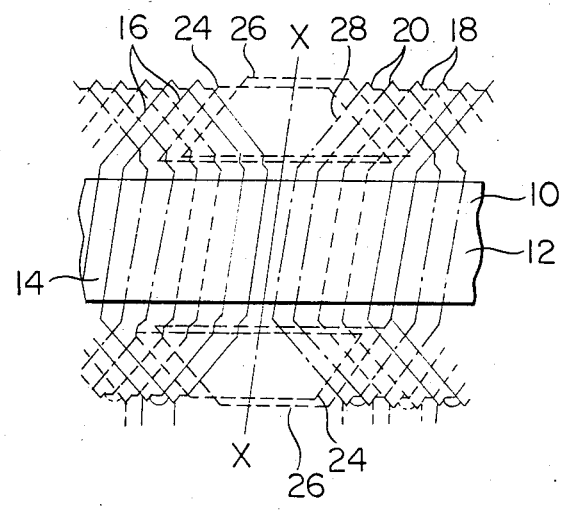
FIGS. 5 and 6 are diagrams illustrating alternative forms of stator armature windings according to the present invention.
Figure 6:
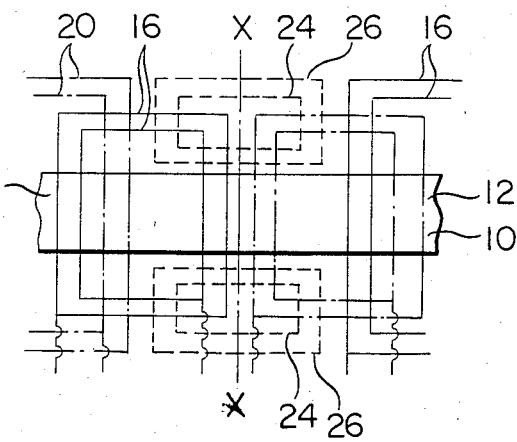

While the present invention has been described in terms of a particular embodiment thereof, it is to be understood that many modifications may be incorporated. For example, the number of slots for each pole and phase may be changed, the phase number may be changed to be more than three, and as shown in FIG. 6, the armature winding may be a single layer concentric winding. Also, the stator may be divided into any number of pieces. Furthermore, the stator slots may be skewed at suitable angles as shown in FIG. 5.

What is claimed is:

1. A split stator armature winding comprising
   a circumferentially split stator core having slots formed therein;
   a plurality of armature coils mounted in a single layer in said slots without bridging the splitting interface of said split stator; and
   a closed-loop dummy coil disposed so as to bridge said splitting interface of said split stator and in the vicinity of the back portion of the coil ends of said armature coils close to said splitting interface of said split stator.

2. A split stator armature winding as claimed in claim 1, wherein said armature coils are in a single layer and all have the same hexagonal shape.

3. A split stator armature winding as claimed in claim 1, wherein said armature coils are in a single layer and are concentrically wound.

4. A split stator armature winding as claimed in claim 1, wherein said slots of said stator core are skewed.

* * * * *